United States Patent
Nakayama (10) Patent No.: US 10,656,417 B2
(45) Date of Patent: May 19, 2020

(54) HEADS-UP DISPLAY DEVICE (71) Applicant: Panasonic Intellectual Property Management Co., Ltd., Osaka (JP)

(72) Inventor: Kenji Nakayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 180 days.

(21) Appl. No.: 16/047,019

(22) Filed: Jul. 27, 2018

(65) Prior Publication Data
US 2018/0373031 A1 Dec. 27, 2018

Related U.S. Application Data (63) Continuation of application No. PCT/JP2016/005234, filed on Dec. 27, 2016.

(30) Foreign Application Priority Data

Feb. 25, 2016 (JP) .................... 2016-034352

(51) Int. Cl.
G02B 27/01 (2006.01)
B60K 37/00 (2006.01)
(Continued)

(52) U.S. Cl.
CPC .......... G02B 27/0101 (2013.01); B60K 35/00 (2013.01); B60K 37/00 (2013.01);
(Continued)

(58) Field of Classification Search
CPC ............................. G02B 27/0101; G02B 27/01; G02B 27/0977; G02B 2027/014
See application file for complete search history.

(56) References Cited

U.S. PATENT DOCUMENTS

2002/0166273 A1* 11/2002 Nakamura ......... G02B 27/0101
40/593
2008/0285138 A1 11/2008 Lebreton

FOREIGN PATENT DOCUMENTS

JP 2006-065092 3/2006
JP 5020252 B 9/2012

OTHER PUBLICATIONS

International Search Report of PCT application No. PCT/JP2016/005234 dated Feb. 21, 2017.

* cited by examiner

*Primary Examiner* — Joseph P Martinez
(74) *Attorney, Agent, or Firm* — Greenblum & Bernstein, P.L.C.

(57) ABSTRACT

First and second cover members of a cover of a head-up display device cover an opening region of a housing. The first cover member is rotationally movable with respect to the housing around a first rotation fulcrum fixed to the housing. The second cover member is rotationally movable with respect to the first cover member around second rotation fulcrums respectively fixed to first and second end parts of the first cover member. When the first cover member turns with respect to the housing and the second cover member turns with respect to the first cover member, the first end part is located at an outer side than a first side of a mirror, and the second end part is located at an outer side than a second side of the mirror. The second cover member is not present in an optical path of light projected from a projector to the mirror.

4 Claims, 7 Drawing Sheets (51) Int. Cl.
*B60K 35/00* (2006.01)
*G02B 27/09* (2006.01)
*G03B 21/14* (2006.01)
*G03B 21/20* (2006.01)
(52) U.S. Cl.
CPC ......... *G02B 27/01* (2013.01); *G02B 27/0977* (2013.01); *G03B 21/145* (2013.01); *G03B 21/2066* (2013.01); *B60K 2370/334* (2019.05); *G02B 2027/014* (2013.01)

HEADS-UP DISPLAY DEVICE

CROSS-REFERENCE TO RELATED APPLICATIONS

This application is a continuation of the PCT International Application No. PCT/JP2016/005234 filed on Dec. 27, 2016, which claims the benefit of foreign priority of Japanese patent application No. 2016-034352 filed on Feb. 25, 2016, the contents all of which are incorporated herein by reference.

BACKGROUND

1. Technical Field

The present disclosure relates to a head-up display device.

2. Description of the Related Art

Conventionally, a head-up display (HUD) to be installed in vehicles such as an automobile is known. Known examples of the head-up displays include one that assists a driver by displaying information on a combiner. The combiner is disposed to stand in front of a driver. However, when the driver does not use the combiner, the standing combiner is in the forward sight of the driver, hindering the driving.

In order to solve such a problem, a head-up display device equipped with a storage device is disclosed (see Japanese Patent No. 5020252). The storage device stores a combiner in an instrumental panel (also referred to as a dashboard) when the combiner is not used. In another example of a head-up display device, an optical path and a combiner are hidden by a cover in order to enhance the quality of design when the combiner is stored.

SUMMARY

The present disclosure ensures the quality of design when a combiner of a head-up display device is stored, and mitigates the restriction in the outside dimension of the head-up display device.

A head-up display device of one aspect of the present disclosure includes a projector that projects light, a mirror, a combiner, a housing, and a cover. The mirror reflects the light projected from the projector. The mirror has a first side and a second side on a reverse side of the mirror from the first side. The combiner receives the light reflected by the mirror. The housing includes an opening region through which the light reflected by the mirror passes when the combiner receives the reflected light, and the housing houses the projector and the mirror. The cover includes a first cover member and a second cover member, and covers the opening region. The first cover member is rotationally movable with respect to the housing around a first rotation fulcrum fixed to the housing. Furthermore, the first cover member includes a first end part and a second end part which are on a same side with respect to the first rotation fulcrum. The second cover member is rotationally movable with respect to the first cover member around second rotation fulcrums respectively fixed to the first end part and the second end part. The second cover member includes a first side that is located closest to the first rotation fulcrum and faces the first cover member when the first cover member and the second cover member cover the opening region. When the first cover member turns with respect to the housing, and the second cover member turns with respect to the first cover member, the first end part is located on an outer side than the first side of the mirror, and the second end part is located at an outer side than the second side of the mirror. Furthermore, the second cover member is not present in an optical path of the light projected from the projector to the mirror.

The present disclosure can provide a head-up display device ensuring quality of design when a combiner is stored, and mitigating the restriction of the outside dimension.

DETAILED DESCRIPTION OF PREFERRED EMBODIMENTS

Prior to the description of the exemplary embodiment of the present disclosure, problems of a conventional head-up display device are described briefly. When a combiner is standing, it is necessary to prevent a cover from obstructing an optical path of light that is emitted from a projector of the head-up display device, reflected by a mirror, and emitted to a combiner. In an example of layouts to solve this problem, a sufficient interval is secured between the mirror and a tip end of the cover. In another example of the layouts arrangement of a projector is adjusted so as to allow the emitting direction of light from the projector to be close to the vertical direction. However, any of these layouts lead to restriction of the outside dimension of the head-up display device, making it difficult to reduce the size of the head-up display device.

Hereinafter, the exemplary embodiments of the present disclosure are described in detail with reference to drawings.

Figure 1:
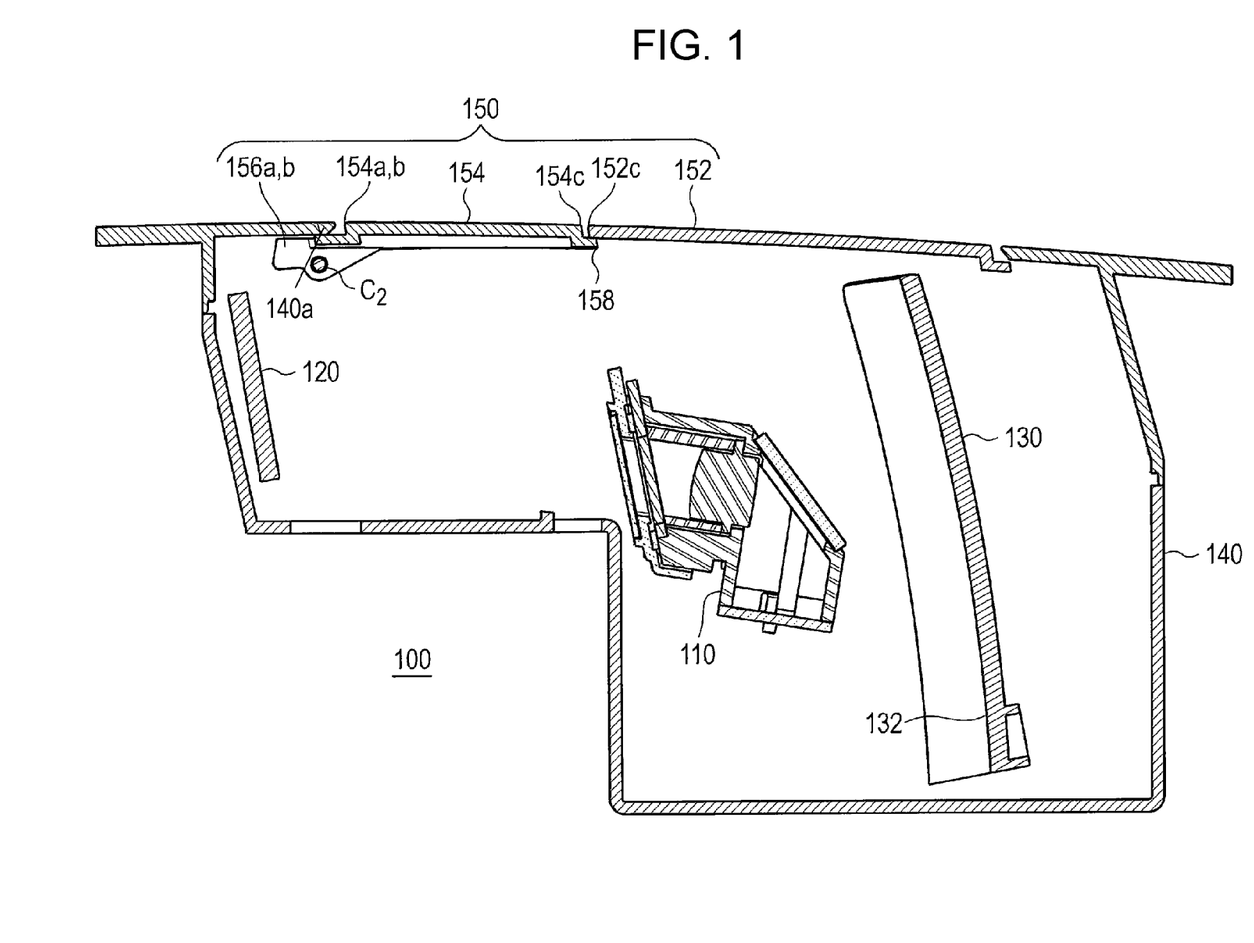
FIG. 1 is a sectional view of a head-up display device when a combiner is housed in accordance with an exemplary embodiment of the present disclosure.
Figure 2:
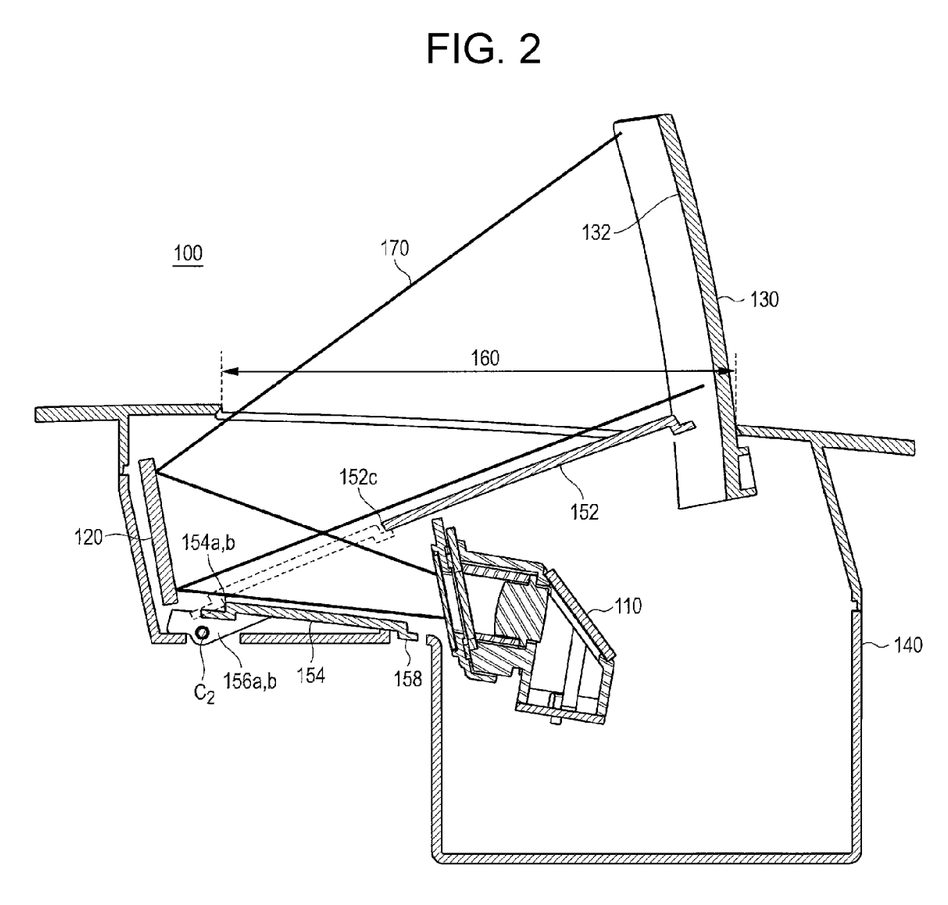
FIG. 2 is a sectional view of the head-up display device shown in FIG. 1 when the combiner is raised.
Figure 3:
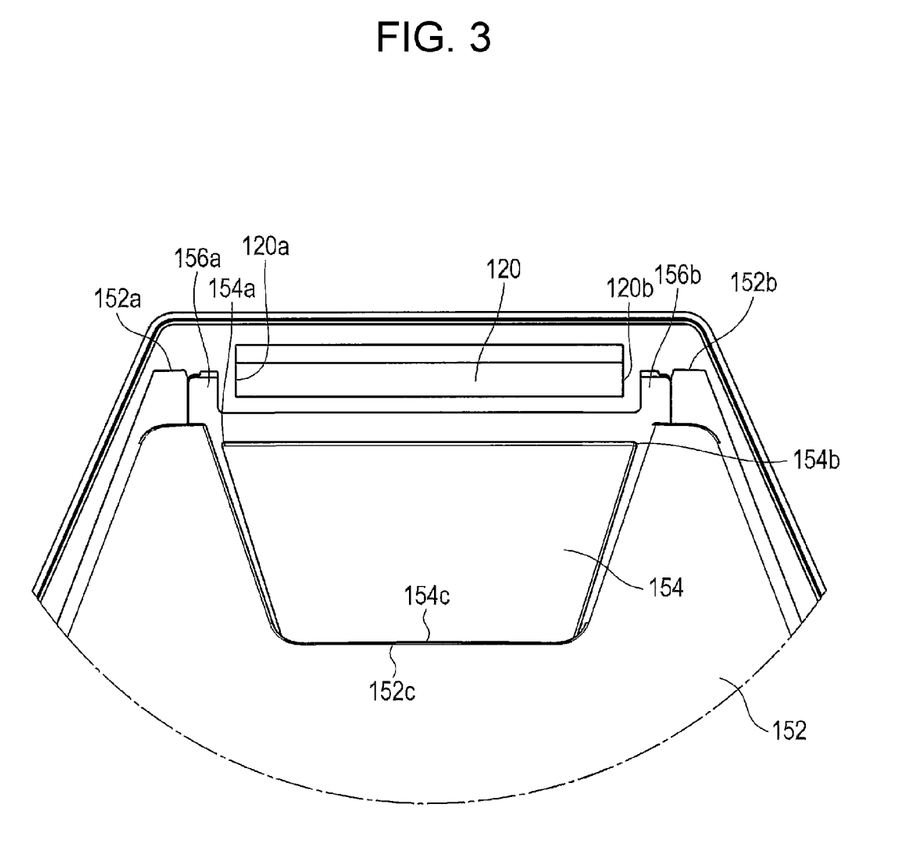
FIG. 3 is a top view of the head-up display device shown in FIG. 1 in which a cover is opening or closing.
Figure 4:
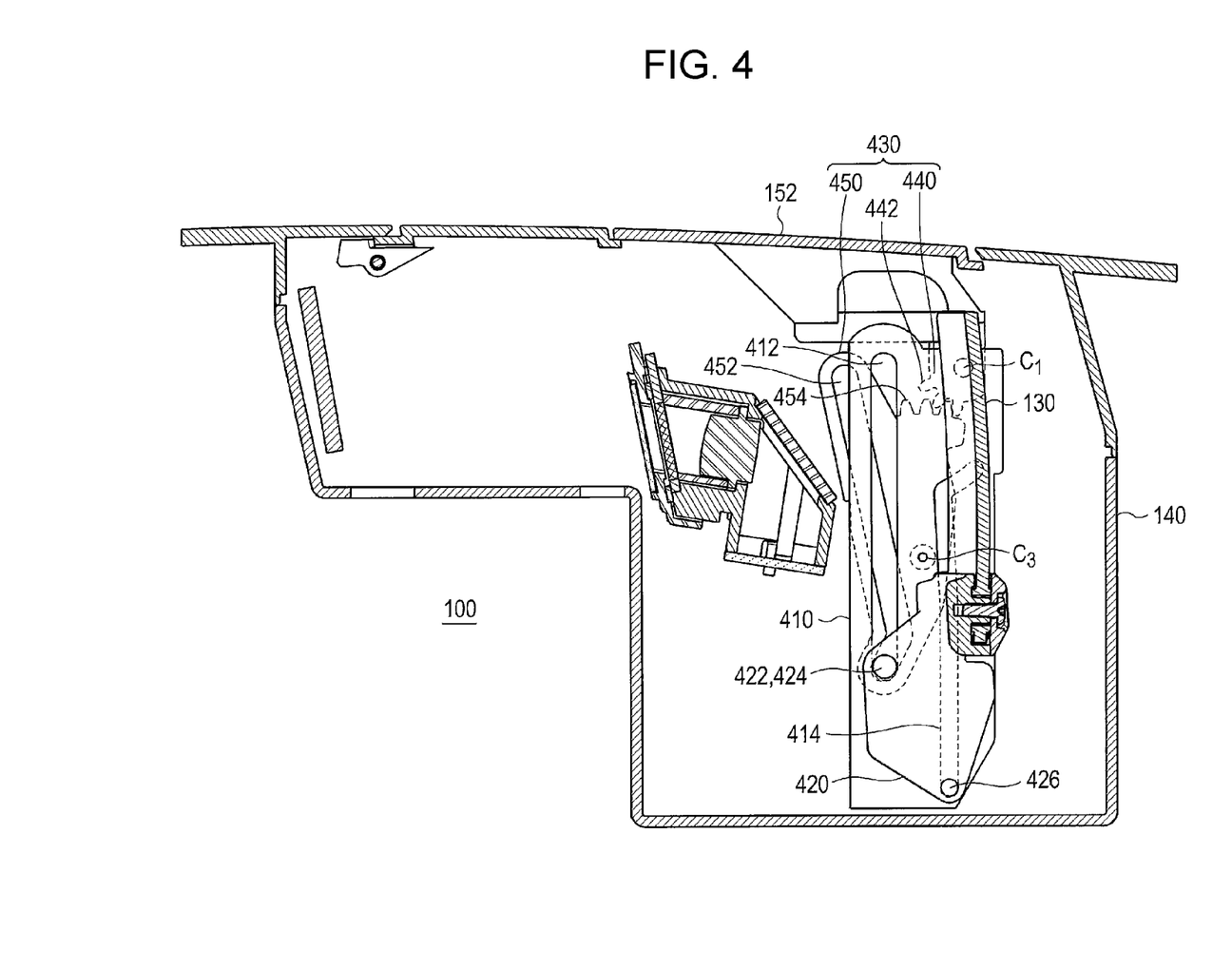
FIG. 4 is a sectional view showing the head-up display device shown in FIG. 1 in detail when the combiner is housed.

FIG. 1 is a sectional view of head-up display device 100 when combiner 130 is housed. FIG. 2 is a sectional view of head-up display device 100 when combiner 130 is raised. FIG. 3 is a top view of the head-up display device in which a cover is opening or closing. FIG. 4 is a detail sectional view showing head-up display device 100 when combiner 130 is housed. Head-up display device 100 is provided in, for example, an instrumental panel (also referred to as a dashboard).

As shown in FIG. 1, head-up display device 100 includes projector 110, mirror 120, combiner 130, housing 140, and cover 150. Housing 140 accommodates projector 110 and mirror 120. As in one example, housing 140 is provided to be capable of housing combiner 130. Cover 150 is provided to cover opening region 160 (see FIG. 2) of housing 140, and to close and open opening region 160 of housing 140. As shown in FIG. 3, mirror 120 has first side 120a and second side 120b on a reverse side of mirror 120 from first side 120a.

Combiner 130 shown in FIG. 1 is provided in housing 140 such that combiner 130 is raised through opening region 160 as cover 150 opens opening region 160. Combiner 130 is, for example, a half mirror, and includes a plate glass and a semi-transmissive film made of tin, silver, or the like, deposited on one side of the plate glass. A user can watch forward of the vehicle through combiner 130.

When combiner 130 is raised, the reflected light that has projected from projector 110 and reflected by mirror 120 is projected, as an image, on combiner projection surface 132. In this way, mirror 120 is provided in such a position as to reflect the light projected from projector 110, and combiner 130 receives the reflected light. When the image is projected onto combiner projection surface 132, this reflected light passes through opening region 160. Thus, a user sees the image projected onto combiner 130, overlaid with a view forward of a vehicle. Examples of this image include an image indicating the speed of the vehicle, the amount of remaining fuel, and the like, or an image indicating the distance to a destination, the direction of travel, the name of the current location, the names of nearby facilities and shops at the current location, etc.

Cover 150 shown in FIG. 1 includes first cover member 152 and second cover member 154 as also shown in FIG. 3. Second cover member 154 includes first end part 152a, second end part 152b, first locking portion 156a, second locking portion 156b, and third locking portion 158 (see FIG. 2). First locking portion 156a and second locking portion 156b are provided in the vicinity of first end part 152a and second end part 152b, respectively.

As shown in FIG. 4, first cover member 152 is rotationally movable with respect to housing 140 around first rotation fulcrum C1 fixed to housing 140. First end part 152a and second end part 152b are on the same side with respect to first rotation fulcrum C1. First rotation fulcrum C1 is described later with reference to FIGS. 4 to 6.

Second cover member 154 shown in FIG. 1 is connected to first cover member 152 rotationally movably around second rotation fulcrums C2 that are respectively fixed to first end part 152a and second end part 152b of first cover member 152. As a connection member for connecting second cover member 154 to first cover member 152, a rotating shaft penetrating through, for example, the vicinity of first end part 152a of first cover member 152 and the vicinity of first end part 154a of second cover member 154, and a rotating shaft penetrating through, for example, the vicinity of second end part 152b of first cover member 152 and the vicinity of second end part 154b of second cover member 154, shown in FIG. 3, are used.

When first locking portion 156a and second locking portion 156b shown in FIG. 1 are locked into end part 140a located in opening region 160 of housing 140, first cover member 152 and the second cover member 154 are substantially flush to each other so as to cover opening region 160. Thus, cover 150 closes opening region 160. For example, first locking portion 156a and second locking portion 156b are fixed to first end part 154a and second end part 154b of second cover member 154.

Third locking portion 158 is fixed to the vicinity of first side 154c, which is the closest to first rotation fulcrum C1 (see FIG. 4) of second cover member 154. When first locking portion 156a and second locking portion 156b are locked into end part 140a of housing 140, third locking portion 158 is brought into contact with the vicinity of side 152c of first cover member 152. Side 152c faces first side 154c of second cover member 154 closer to first rotation fulcrum C1. In this state, first side 154c faces first cover member 152, and first cover member 152 and second cover member 154 are substantially flush with each other so as to cover opening region 160.

There may be provided a biasing portion that biases second cover member 154 toward the outside of housing 140 (in the upper direction or in the direction opposite to a bottom part of housing 140) when third locking portion 158 is brought into contact with the vicinity of side 152c of first cover member 152. One example of the biasing portion may be an elastic member added to the connection member connecting second cover member 154 to first cover member 152.

Another example may be a magnet or an electro-magnet provided in the vicinity of side 152c of first cover member 152, and a magnet or an electro-magnet provided in the vicinity of first side 154c of second cover member 154 closer to first rotation fulcrum C1. Thus, when cover 150 closes opening region 160, even in a case where some force is applied to second cover member 154 from the upside, the closed state of opening region 160 by cover 150 is maintained.

Next, an opening operation of cover 150 that closes opening region 160 is described. When the opening operation is started, until first locking portion 156a and second locking portion 156b reach the bottom part of housing 140, second cover member 154, together with first cover member 152, turns with respect to housing 140 around first rotation fulcrum C1 fixed to housing 140.

Next, as shown in FIG. 2, when first locking portion 156a and second locking portion 156b reach the bottom part of housing 140, first locking portion 156a and second locking portion 156b are locked into the bottom part of housing 140. Next, first locking portion 156a and second locking portion 156b bias second cover member 154 downward so as to allow second cover member 154 to turn with respect to first cover member 152 around second rotation fulcrums C2. Thus, since second cover member 154 can turn based only on driving force supplied to first cover member 152, a drive unit that is single-purposed to second cover member 154 is not required to be provided separately. In this way, when first cover member 152 turns with respect to housing 140, first locking portion 156a and second locking portion 156b are locked into the bottom part of housing 140. As a result, a part of second cover member 154 is pushed toward the bottom part of housing 140, thus, second cover member 154 rotationally moves with respect to first cover member 152 around second rotation fulcrums C2.

When second cover member 154 turns with respect to first cover member 152 around second rotation fulcrums C2, and third locking portion 158 reaches the bottom part of housing 140, third locking portion 158 is brought into contact with the bottom part of housing 140. In this state, since second cover member 154 is not present in the optical path of light projected from projector 110 to mirror 120, so that optical path 170 of the light projected from projector 110 can be secured.

When first cover member 152 turns with respect to housing 140 and second cover member 154 turns with respect to first cover member 152, as shown in FIG. 3, first end part 152a is located at the outer side of first side 120a of mirror 120, and second end part 152b is located at the outer side of second side 120b of mirror 120. Thus, as compared with a case where first end part 152a is not located at the outer side of first side 120a of mirror 120 or a case where second end part 152b is not located at the outer side of second side 120b of mirror 120, restriction of the outside dimension in the back-and-forth direction of the head-up display device can be further mitigated.

Figure 5:
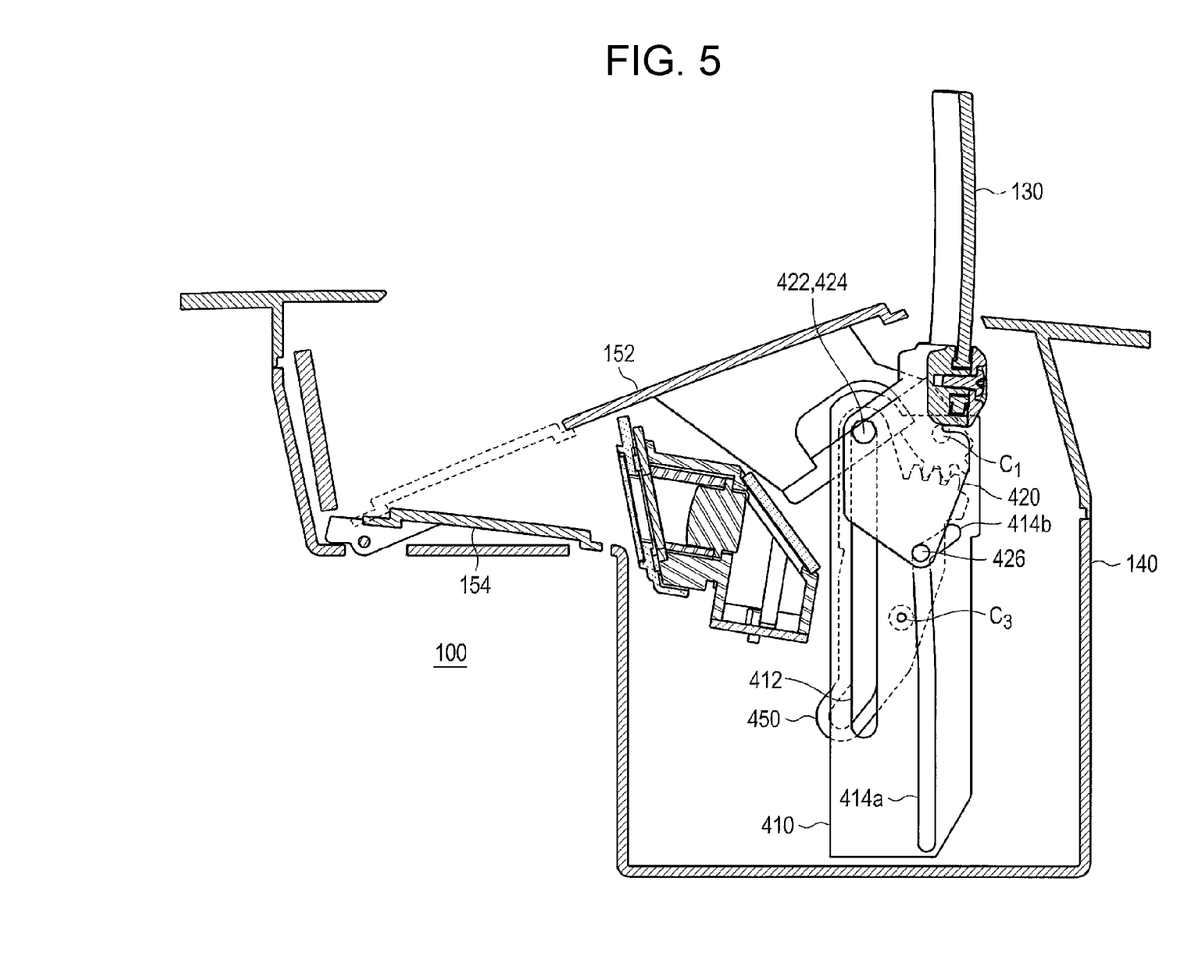
FIG. 5 is a sectional view showing the head-up display device shown in FIG. 2 in detail when the combiner is raised.
Figure 6:
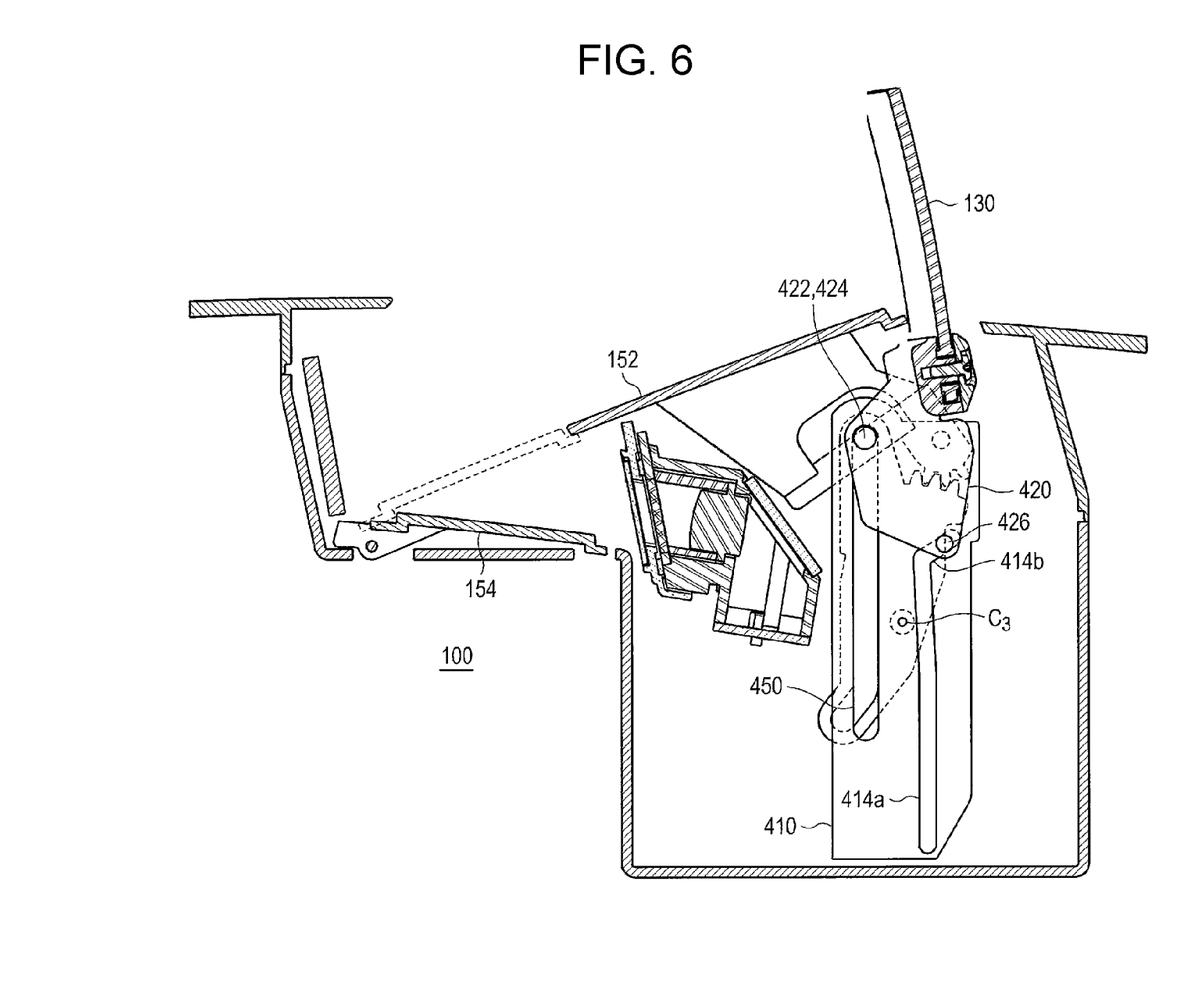
FIG. 6 is a sectional view of the head-up display device shown in FIG. 1 when the combiner is tilted.

FIG. 5 is a sectional view of head-up display device 100 when combiner 130 is raised. FIG. 6 is a sectional view of the head-up display device when the combiner is tilted. In one example, as shown in FIG. 4, head-up display device 100 includes a combiner lifting device and cover operation mechanism 430. The combiner lifting device includes guide members 410, support member 420, and a drive unit. The combiner lifting device is housed in housing 140.

Guide members 410 shown in FIG. 5 are provided to both sides of combiner 130, respectively. Each of guide members 410 is fixed to housing 140, and is provided with second groove 412 and third groove 414 shown in FIG. 4. Third groove 414 includes a lifting groove region (hereinafter, referred to as a "groove region") 414a and angle-adjustment groove region (hereinafter, referred to as a "groove region") 414b. Groove region 414b is one example of the first groove region, and groove region 414a is one example of the second groove region. Groove region 414a is provided in parallel to second groove 412. Groove region 414a is linked to groove region 414b at the upper end thereof.

Support member 420 is fixed to combiner 130 and supports combiner 130. Support member 420 includes first protruding portion 422, second protruding portion 424, and third protruding portion 426. Second protruding portion 424 and third protruding portion 426 slide on second groove 412 and third groove 414, respectively.

The drive unit is connected to support member 420. The drive unit can raise and lower support member 420 by driving of an electric motor (not shown). Along with lifting of support member 420, combiner 130 fixed to support member 420 is also raised and lowered. The drive unit can further adjust an angle of support member 420 by driving of the electric motor. Along with the adjustment of the angle of support member 420, the angle of combiner 130 fixed to support member 420 is also adjusted.

The drive unit may raise or lower support member 420 and adjust an angle of support member 420 by driving of the electric motor, in response to an operation by a user (driver or passenger).

Cover operation mechanism 430 shown in FIG. 4 includes first gear portion 440 and second gear portion 450. First gear portion 440 includes first teeth portion 442. Second gear portion 450 includes first groove 452 and second teeth portion 454. First teeth portion 442 meshes with second teeth portion 454. First protruding portion 422 slides on first groove 452.

First gear portion 440 is fixed to first cover member 152, and is rotationally movable around first rotation fulcrum C1. Second gear portion 450 is connected to housing 140 rotationally movably around third rotation fulcrum C3.

Figure 7:
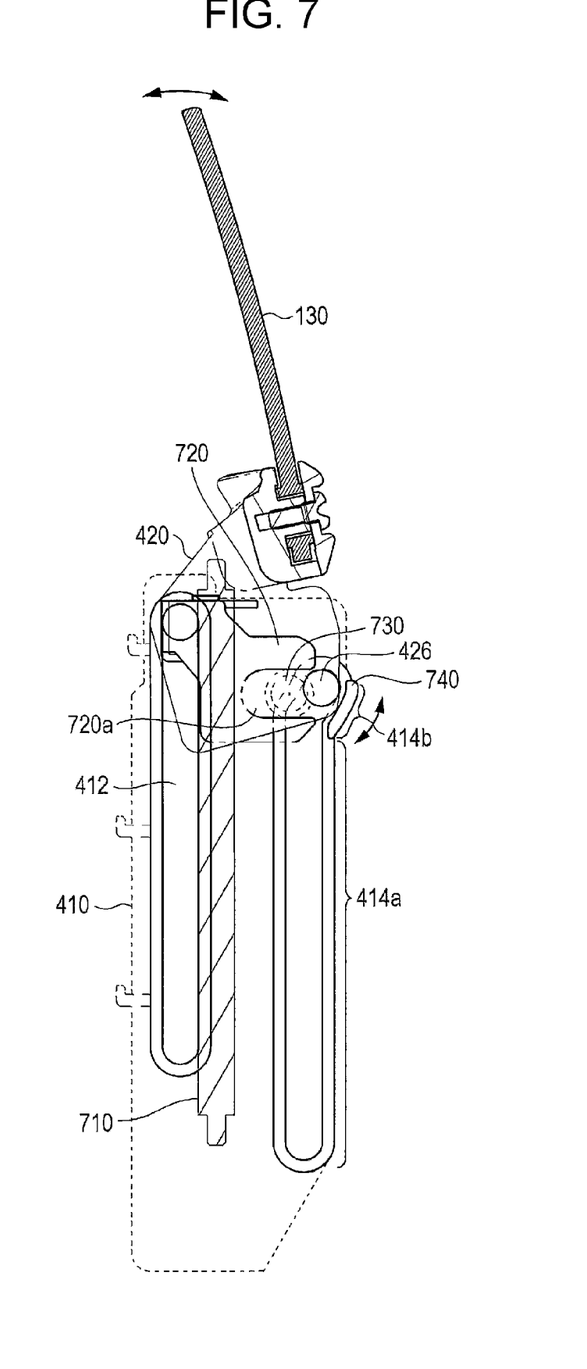
FIG. 7 is a view for illustrating a drive unit of the head-up display device shown in FIG. 1.

FIG. 7 is a view for illustrating the drive unit. The drive unit includes an electric motor (not shown), a motor gear (not shown) rotated by the electric motor, feed screw 710 that meshes with the motor gear and extends in the lifting direction of combiner 130, and movable portion 720 connected to feed screw 710. Movable portion 720 has cut-away portion 720a that receives fourth protruding portion 730 provided to support member 420 such that fourth protruding portion 730 can slide in the horizontal direction.

As shown in FIG. 7, fourth protruding portion 730 is inserted into cut-away portion 720a of movable portion 720. Power for lifting movable portion 720 by feed screw 710 is transferred to support member 420 via cut-away portion 720a so as to raise and lower combiner 130.

Herein, the relation between guide member 410 and support member 420 is described with reference to FIGS. 4 to 6.

As shown in FIG. 4, when combiner 130 is housed, support member 420 is located in the lowermost part, and second protruding portion 424 and third protruding portion 426 are located at the lowermost end of second groove 412 and the lowermost end of third groove 414, respectively. When combiner 130 starts to be raised along with raising of support member 420, second protruding portion 424 and third protruding portion 426 slide upward second groove 412 and third groove 414, respectively.

As shown in FIG. 5, when second protruding portion 424 reaches the upper end of second groove 412, support member 420 reaches the upper end and is not further raised. At the same time when second protruding portion 424 reaches the upper end of second groove 412, third protruding portion 426 reaches the upper end of groove region 414a. As a result, third protruding portion 426 is located in groove region 414b communicated to groove region 414a.

From the state shown in FIG. 5, the drive unit allows movable portion 720 to be further raised via the motor gear and feed screw 710 shown in FIG. 7. Then, third protruding portion 426 slides horizontally on cut-away portion 720a of movable portion 720, third protruding portion 426 slides on groove region 414b, and support member 420 turns around second protruding portion 424 (see FIG. 6). Along with this, as shown in FIG. 6, an angle of support member 420 is adjusted, and an angle of combiner 130 fixed to support member 420 is also adjusted.

Next, the relation between support member 420 and cover operation mechanism 430 is described with reference to FIGS. 4 and 5.

As shown in FIG. 4, when combiner 130 is housed, support member 420 is located in the lowermost part, and first protruding portion 422 is located at the lower end of first groove 452. In this case, first gear portion 440 biased by first protruding portion 422 biases first cover member 152 toward the outside of housing 140 via second gear portion 450 having second teeth portion 454 that meshes with first teeth portion 442, so that first cover member 152 and second cover member 154, which closes opening region 160, are substantially flush with each other so as to cover opening region 160.

When combiner 130 starts to be raised along with raising of support member 420, before the upper end of combiner 130 reaches cover 150, first protruding portion 422 that slides on first groove 452 allows second gear portion 450 to rotate around third rotation fulcrum C3. When second gear portion 450 rotates, first gear portion 440 having first teeth portion 442 that meshes with second teeth portion 454 rotates around first rotation fulcrum C1, and allows first cover member 152 fixed to first gear portion 440 to turn. Accordingly, first cover member 152 opens opening region 160 that has been closed.

Note here that by adjusting the shape of first groove 452, it is possible to adjust the timing and speed of rotation of second gear portion 450, that is, the timing and speed at which opening region 160 is opened by first cover member 152 along with the raising of combiner 130.

As shown in FIG. 5, when combiner 130 is raised, support member 420 is located in the uppermost part, and first protruding portion 422 is located at the upper end of first groove 452 shown in FIG. 4. In this case, first gear portion 440 biased by first protruding portion 422 biases first cover member 152 shown in FIG. 5 downward via second gear portion 450 including second teeth portion 454 that meshes with first teeth portion 442, so that an optical path of the light projected from projector 110 is secured.

In this way, in response to the lifting of support member 420, cover operation mechanism 430 allows first cover member 152 to turn. Therefore, since first cover member 152 can turn based on only driving force supplied to support member 420, a driving means that is single-purposed to first cover member 152 is not required to be provided separately.

In one example, the width of groove region 414b shown in FIGS. 4 to 6 may be narrower than that of groove region 414a. Thus, sliding load of third protruding portion 426 in groove region 414b is larger than the sliding load of third protruding portion 426 in groove region 414a. Therefore, when combiner 130 is tilted, the position of third protruding portion 426 that slides on groove region 414b becomes stable. Thus, wobble due to vibration in support member 420 and combiner 130 can be suppressed. This makes it possible to suppress wobble of an image displayed on combiner 130, facilitating visual checking of the image by a user.

Groove region 414b may be provided with rib 740 shown in FIG. 7 with which third protruding portion 426 is brought into contact during sliding. Rib 740 may be formed unitarily with third groove 414 in guide member 410, or may be brought into contact with third groove 414 as a separate member from guide member 410. Thus, when third protruding portion 426 moves along groove region 414b, an area in which third protruding portion 426 is brought into contact with groove region 414b or rib 740 is increased. Therefore, the sliding load of third protruding portion 426 in groove region 414b is further increased.

When the sliding load of third protruding portion 426 in groove region 414b is larger than the sliding load of third protruding portion 426 in groove region 414a, a torque of the electric motor may be made larger in the time when third protruding portion 426 is located in groove region 414b than in the time when third protruding portion 426 is located in groove region 414a. Thus, even in a portion in which the sliding load is large, third protruding portion 426 can slide smoothly. When third protruding portion 426 is located in groove region 414a, third protruding portion 426 can slide quickly with small torque.

Note here that the operation from a state in which combiner 130 is housed to a state in which it is raised and the operation from a state in which combiner 130 is raised to a state in which it is tilted are described above with reference to FIGS. 1 to 6. An operation from a state in which combiner 130 is tilted to a state in which it is raised and an operation from a state in which combiner 130 is raised to a state in which it is housed are respectively carried out by reversing the operation from a state in which combiner 130 is housed to a state in which it is raised and the operation from a state in which combiner 130 is raised to a state in which it is tilted, and are apparent to a person skilled in the art even without describing in detail.

Other Exemplary Embodiments

In the exemplary embodiment shown in FIGS. 4 to 6, first protruding portion 422 and second protruding portion 424 are achieved by using the same protruding portion, but first protruding portion 422 and second protruding portion 424 may be provided separately. Furthermore, an exemplary embodiment in which first protruding portion 422 and third protruding portion 426 are achieved by using the same protruding portion, and an exemplary embodiment in which first third protruding portion 426 and fourth protruding portion 730 (see FIG. 7) are achieved by using the same protruding portion may be possible.

As described above, it is suitable that a head-up display device according to the present invention is provided in compact in an instrumental panel of a vehicle.

What is claimed is:

1. A head-up display device comprising:
a projector that projects light;
a mirror that reflects the light projected from the projector, and has a first side and a second side on a reverse side of the mirror from the first side;
a combiner which receives the light reflected by the mirror;
a housing that includes an opening region through which the light reflected by the mirror passes when the combiner receives the reflected light, and houses the projector and the mirror; and
a cover including a first cover member and a second cover member, and covering the opening region,
wherein the first cover member is rotationally movable with respect to the housing around a first rotation fulcrum fixed to the housing, and includes a first end part and a second end part on a same side with respect to the first rotation fulcrum,
the second cover member is rotationally movable with respect to the first cover member around second rotation fulcrums respectively fixed to the first end part and the second end part,
the second cover member includes a first side that is located closest to the first rotation fulcrum and faces the first cover member when the first cover member and the second cover member cover the opening region, and
when the first cover member turns with respect to the housing and the second cover member turns with respect to the first cover member, the first end part is located on an outer side than the first side of the mirror, the second end part is located at an outer side than the second side of the mirror, and the second cover member is not present in an optical path of the light projected from the projector to the mirror.

2. The head-up display device according to claim 1, wherein the second cover member includes:
a first locking portion provided in a vicinity of the first end part; and
a second locking portion provided in a vicinity of the second end part,
when the first cover member and the second cover member cover the opening region, the first locking portion and the second locking portion are locked into an end part located in the opening region of the housing, respectively, and
when the first cover member turns with respect to the housing, the first locking portion and the second locking portion are locked into a bottom part of the housing, so that a part of the second cover member is pushed toward the bottom part of the housing, and the second cover member rotationally moves with respect to the first cover member around the second rotation fulcrums.

3. The head-up display device according to claim 2, wherein the second cover member further includes a third locking portion in a vicinity of the first side of the second cover member, the first cover member includes a side facing the first side of the second cover member when the first cover member and the second cover member cover the opening region, when the first locking portion and the second locking portion are locked into the end part located in the opening region of the housing, the third locking portion is brought into contact with a vicinity of the side of the first cover member, and when the first locking portion and the second locking portion are locked into the bottom part of the housing, the third locking portion is brought into contact with the bottom part of the housing.

4. The head-up display device according to claim 3, wherein the cover further includes a biasing portion that biases the second cover member toward an outside of the housing when the first cover member and the second cover member cover the opening region.

\* \* \* \* \*